April 10, 1951 P. D. BLEWETT 2,548,647
ELECTRIC PERCOLATOR

Filed Sept. 5, 1947 2 Sheets-Sheet 1

Philip D. Blewett,
INVENTOR.

BY Ross C. Hurrey

April 10, 1951 P. D. BLEWETT 2,548,647
ELECTRIC PERCOLATOR
Filed Sept. 5, 1947 2 Sheets-Sheet 2

Philip D. Blewett,
INVENTOR.

BY Ross C. Murray

Patented Apr. 10, 1951

2,548,647

UNITED STATES PATENT OFFICE 2,548,647

ELECTRIC PERCOLATOR

Philip D. Blewett, Oakland, Calif.

Application September 5, 1947, Serial No. 772,289

1 Claim. (Cl. 219—43)

This invention relates to electrically heated utensils, and particularly to an improved form of electric percolator.

It is a primary object of the invention to provide an electrically heated percolator, especially of the cold-water valve type, in which the coffee-making part can readily be detached from the heating unit in order to permit thorough washing of the former without endangering the electrical portion. It is a further object to provide such an apparatus in which the detachability of the parts is accomplished by means which eliminate any possibility of their coming apart by accident or at times when the percolator is in use. This latter feature is important where, as in my preferred embodiment, the electrical heating unit constitutes the base of the device, so that inadvertent separation of the parts would render the coffee-containing part unstable and liable to tipping or spilling.

A still further object of the invention is to provide a percolator of the above type in which maximum efficiency of heat transfer is obtained between the water-heating cup portion of the percolator, and the electrical heating element, regardless of slight deviations from the ideal shape and sizes of the parts, such as deviations due to temperature changes or to manufacturing tolerances.

An additional object is to provide apparatus in which the electrical heating element is protected against overheating and burn-outs which would otherwise result when the coffee-making part is detached from the heater, due to the lack of normal conduction of heat away from the heating element, for example when the parts are detached while the current is still being supplied to the heater element.

Figure 1:
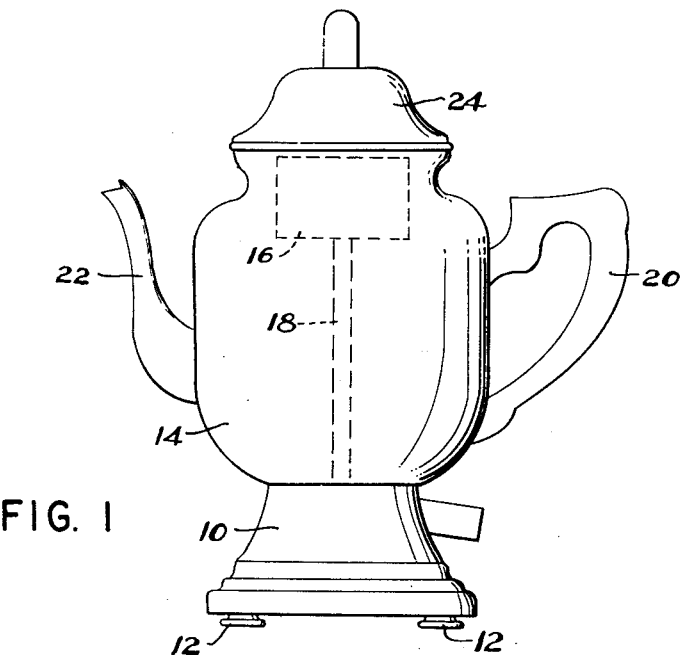
Figure 2:
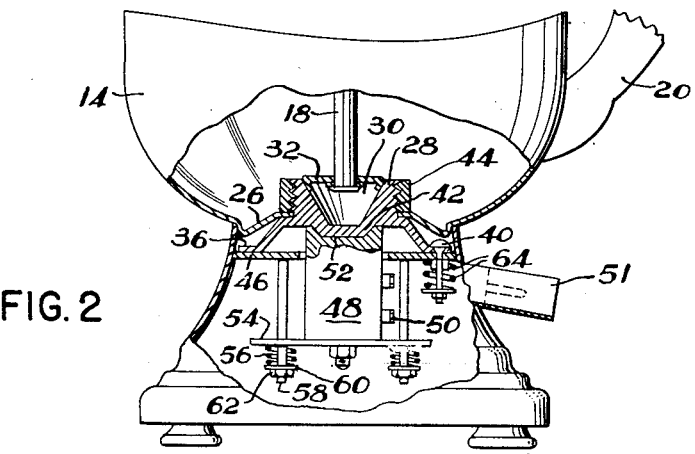
Figure 3:
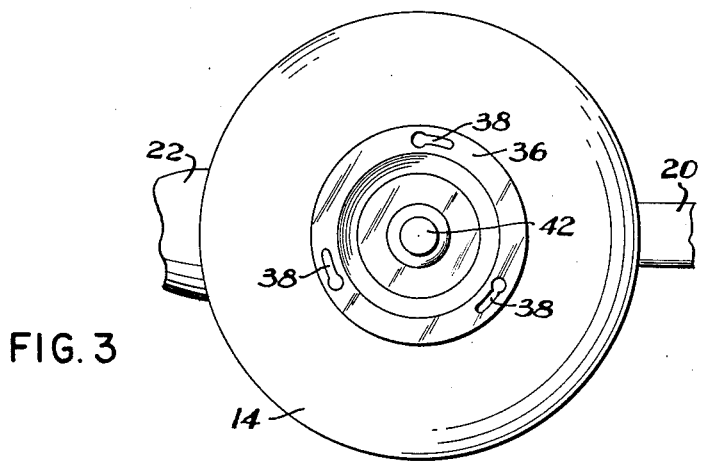
Figure 4:
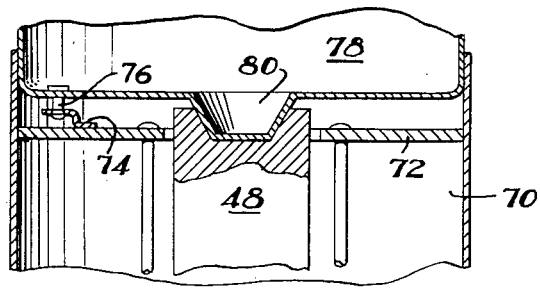
Figure 6:
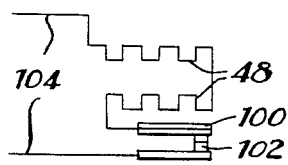
Figure 5:
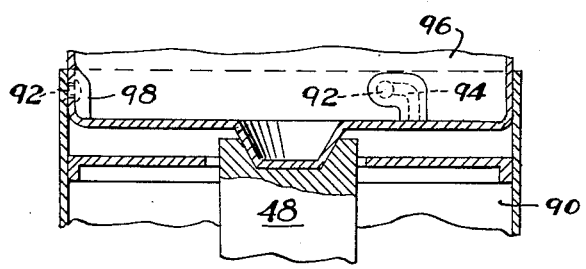

The above and other objects and advantages of the invention will be best understood from the following detailed specification of a preferred manner of carrying the invention into effect, taken in connection with the appended drawings, in which:

Fig. 1 is a side elevational view of an electric percolator in accordance with the invention, Fig. 2 is an enlarged view of a portion of the structure shown in Fig. 1, a part of the casing being broken away and parts being shown in section, Fig. 3 is a bottom view of the coffee-making part of the apparatus, Fig. 4 is a fragmentary sectional view of a modified form of connecting means between the separable parts of the percolator, Fig. 5 is a view similar to Fig. 4 but illustrating a third modification of the connecting means, and Fig. 6 is a schematic wiring diagram showing the thermal protective element for the electrical heater.

In the cold-water valve type of percolator, the heat for boiling the water is supplied to a relatively small cup-like member or depression located in the bottom of the coffee-making part, and within which all the boiling takes place. Heretofore, it has been extremely difficult to clean the coffee-making part, and particularly this cup-like member, or to remove scale therefrom, because of the impossibility of immersing the entire unit in water without contaminating the electrical heating portions of the device. The application of cleaning water has had to be very sparse to avoid splashing the electrical portion, and moreover, the necessity of waiting for the entire heating unit to cool down has been a source of inconvenience.

In accordance with my invention, I provide a percolator of the above type in which the coffee-making part is readily separable from the heating unit to enable the former to be cleaned by any desired method and at any desired time. This would appear to be an obvious solution to the stated problem, but as a matter of fact its execution is complicated by several factors which have heretofore prevented the construction of a satisfactory device of this nature. First, it is essential that the parts of the percolator be normally very securely fastened to one another, because the slightest uncertainty in the joint makes the percolator definitely a safety hazard, because of the danger that the coffee-making part will tip away from the base, with consequent spilling of its contents. Second, since the heat balance between the upper or coffee-making portion and the heating element is dependent upon the conduction of a large quantity of heat from the element into the body of water contained in the percolator, any removal of the upper part while the device is connected to the electrical supply is liable to overheat the element and cause a burn-out or possible fire damage. Third, any separable connection of ordinary type would involve necessarily a very inefficient transfer of heat into the body of water, due to slight and unavoidable variations in the fit between the conducting portions of the device. For maximum efficiency, it is essential that the heater and the heated portion be in substantial and intimate contact with one another, and this requirement has heretofore been considered incompatible with mass production of separably joined parts.

In accordance with my invention, the connection between the separable parts is so constructed as to give a firm and dependable, yet readily releasable, joint between the parts, and any inaccuracies in the interfitting relationship of the parts are compensated for by a resilient mounting of one of these, preferably the heater element, so that the thermal conductivity of the joint is maintained unimpaired regardless of minor deviations in the parts, or of temperature differences therebetween. A heat control is provided to prevent overheating of the electrical element in the event that the device is plugged in with the parts detached from one another, or in the event that it is operated when the water has accidentally been omitted or has boiled away.

Referring now to Figs. 1 and 2 of the drawings, I have illustrated a preferred form of the invention as comprising a base unit 10 provided with feet or knobs 12 adapted to insulate the device from the table or other support, and a separable coffee-making part 14 slightly telescopically received within the upper portion of base unit 10. The upper part 14 is adapted to contain the usual perforated basket 16 and water tube 18 shown in dotted lines in Fig. 1, and is provided with a conventional handle 20 and pouring spout 22, as well as any desired form of lid or cover 24.

As best shown in Fig. 2, the side walls of the coffee-making part 14 converge to form a bottom plate 26 which has a central aperture adapted to receive an upwardly projecting threaded barrel 28 of a connecting member which has formed therein the cup-like recess 30. Recess 30 receives the usual flanged end part 32 of the percolator water-pipe 18. Beneath bottom plate 26, the connecting member diverges outwardly to form a flange 36 in which are preferably formed three spaced key-hole slots 38 (Fig. 3) to receive the heads of three securing bolts or headed pins such as pin 40 (Fig. 2). Centrally of the flange 36, the connecting member is formed with a downwardly extending, tapered heat conducting boss 42. A collar 44 is threaded upon barrel 28 in order to clamp the latter firmly in place on the bottom of the coffee-making part in a liquid tight manner.

The base unit 10 of the device comprises a hollow shell within which is secured a transverse support plate 46 which may be welded or otherwise fastened to the side walls, and which plate 46 has a central aperture through which rises the electrical heater element 48. The latter element may be a ceramic body molded about a resistance type of heater element and provided with terminals 50, connected by wires (not shown) to a standard outlet 51, or it may be of any equivalent construction. Element 48 has its upper surface formed with a taper-sided depression 52 shaped to conform exactly with the shape of boss 42 mentioned above, and to ensure a firm contact between these parts, for the efficient conduction of heat, the heater element is resiliently mounted within base unit 10 as by being bolted to a mounting plate 54 resting upon a pair of springs 56 through which pass rods 58 fixedly secured to support plate 46. A washer 60 bears against each of these springs and is held in place by a nut 62 engaging the threaded end of each rod.

It will be obvious from the above description that, when the coffee-making part 14 is placed upon the base unit 10, boss 42 engages the heating element 48 in an intimate manner, regardless of slight deviations in the height or centering of the heater element 48, and is firmly pressed thereagainst to ensure an efficient transfer of heat into the cup-like depression 30. In order to secure the parts firmly but releasably in this relation, I have provided a kind of bayonet joint comprising the three key-hole slots 38 above mentioned, each of which is adapted to receive the headed end of one of the pins 40. These pins are themselves spring-mounted upon support plate 46 as by springs 64 resting upon a washer retained on each pin by a nut engaging its threaded end. Thus, when the parts are placed together and given a slight turn relative to one another, the heads of pins 40 engage over the narrow parts of the slots 38 in a known manner and prevent any accidental disengagement of the parts. The shank of each pin 40 just beneath its head may be tapered to aid in lifting the heads of these pins away from plate 46 when the parts are so turned.

Fig. 4 of the drawing represents an alternative form of joint between the parts of the percolator, the base unit 70 of this figure having a support plate 72 fixed therein and mounting a plurality of brackets 74 each of which may have a key-hole slot of the type described above, adapted to receive a pin 76 secured to and depending from the bottom of the coffee-making part 78, whose periphery is received within the mouth of the base unit in a telescopic fashion. In this embodiment, the cup-like member 80 is formed integrally with the bottom wall of the coffee-making part 78, as by stamping or spinning, but the outer surface of this member 80 engages the heater element 48 in the same way as above described. This construction, while not quite as convenient as the preferred form, is considerably cheaper to manufacture and can be made lighter.

In Fig. 5 of the drawings I have illustrated a third method of joining the parts. In this modification, the base unit 90 contains the resiliently mounted heater 48 as before, but is provided with spaced radially inward extending pins 92 each of which engages a bayonet slot such as 94 in the coffee-making part 96, these slots being sealed off from the interior of the percolator by liquid-tight covers or shrouds 98 which may be welded to the wall structure.

In order to prevent over-heating of the apparatus, and consequent burning out of the heater element, I may include in the electrical circuit a thermally sensitive element such as the bimetallic strip 100 of Fig. 6, placed in heat-transfer relation to the heater element 48 and adapted to break contacts 102 connected between the supply lines 104 and said heater element. Thus, if the device is connected to the electrical power empty, or if the coffee-making part is detached without disconnecting the device, any dangerous increase in temperature will cause an opening of contacts 102, and they will remain open until the device has cooled to a safe temperature. This cycle will be repeated until the situation has been corrected by the user of the apparatus. Obviously, more complicated thermal protective devices may be provided if desired, but I have found that a simple device of this nature is reliable and operates to prevent accidents due to an occasional and temporary absent-mindedness on the part of the user.

Having described the nature of my invention, and how the same is to be performed, I wish it to be understood that the principles thereof can be carried out in other ways, and I wish to include in my invention all such changes and modifications as fall within the scope of the appended claim.

I claim:

An electrically heated percolator comprising: a base support unit, a heating element secured to said base support, a coffeemaking receptacle resting on said base support, the under surface of said receptacle including a protuberant boss of a shape conforming to the upper surface of said heating element, said boss having formed thereby an inverted frusto-conical cup having an altitude less than its major diameter, and manually detachable spring-urged bayonet type connectors arranged peripherally around and below said cup for securing said receptacle to said support and assuring firm contact between the boss and the heating element.

PHILIP D. BLEWETT.

REFERENCES CITED

The following references are of record in the file of this patent:

UNITED STATES PATENTS

| Number | Name | Date |
| --- | --- | --- |
| 678,522 | Seips | July 16, 1901 |
| 979,515 | Kuhn | Dec. 27, 1910 |
| 1,650,999 | Preston | Nov. 29, 1927 |
| 1,694,570 | Watts | Dec. 11, 1928 |
| 1,704,413 | Wait | Mar. 5, 1929 |
| 1,905,111 | Lamb | Apr. 25, 1933 |